(12) United States Patent
Fathi et al.

(10) Patent No.: US 6,312,548 B1
(45) Date of Patent: Nov. 6, 2001

(54) CONDUCTIVE INSERT FOR BONDING COMPONENTS WITH MICROWAVE ENERGY

(75) Inventors: Zakaryae Fathi, Cary; Richard S. Garard, Chapel Hill; Jianghua Wei, Raleigh, all of NC (US)

(73) Assignee: Lambda Technologies, Raleigh, NC (US)

( * ) Notice: Subject to any disclaimer, the term of this patent is extended or adjusted under 35 U.S.C. 154(b) by 824 days.

(21) Appl. No.: 08/625,752

(22) Filed: Mar. 29, 1996

(51) Int. Cl.[7] .................................................... B32B 31/00

(52) U.S. Cl. ...................... 156/275.1; 156/275.3; 156/313; 219/678; 428/369

(58) Field of Search ............... 156/275.1, 275.3, 156/313; 428/369; 219/678

(56) References Cited

U.S. PATENT DOCUMENTS

| | | | |
|---|---|---|---|
| 2,741,402 | 4/1956 | Sayre | 222/215 |
| 2,742,390 | 4/1956 | Beck | 154/126 |
| 3,461,014 | 8/1969 | James | 156/272 |
| 3,612,803 | 10/1971 | Klaas | 219/10.53 |
| 3,620,875 | 11/1971 | Guglielmo, Sr. et al. | 156/272 |
| 3,888,715 | 6/1975 | Fraser et al. | 156/273 |
| 3,941,641 | 3/1976 | Heller, Jr. et al. | 156/272 |
| 4,035,547 | 7/1977 | Heller, Jr. et al. | 428/329 |
| 4,067,765 | 1/1978 | Heller, Jr. et al. | 156/272 |
| 4,106,969 | 8/1978 | Puyplat | 156/275 |
| 4,120,712 | 10/1978 | Sindt | 156/71 |

(List continued on next page.)

FOREIGN PATENT DOCUMENTS

| | | |
|---|---|---|
| 263883 | * 10/1963 | (AU) ................ 156/273.9 |
| 40 20 371 C1 | 12/1991 | (DE) . |
| 40 36 876 A1 | 5/1992 | (DE) . |
| 0 237 657 | 9/1987 | (EP) . |
| 0 399 599 | 11/1990 | (EP) . |
| 1 395 646 | 7/1965 | (FR) . |
| 2 093 573 | 1/1972 | (FR) . |
| 2 489 743 | 3/1982 | (FR) . |
| 2 515 096 | 4/1983 | (FR) . |
| 597666 | 1/1948 | (GB) . |
| 2 262 258 A | 6/1993 | (GB) . |
| WO 97/02725 | 1/1997 | (WO) . |

OTHER PUBLICATIONS

D. S. Sypula; Film Welding by Microwave Heating with Localized Adsorber, *Xerox Disclosure Journal* No. 3 (May/Jun. 1994).

R. J. Lauf et al.; Polymer Curing in a Variable Frequency Microwave Oven, 28th Microwave Power SymLosium (Jul. 1993).

Conductive polymers speed plastic welding *Eureka* 12, No. 11:21 (Nov. 1992).

International Search Report for PCT/US97/04583.

*Primary Examiner*—John J. Gallagher
(74) *Attorney, Agent, or Firm*—Myers Bigel Sibley & Sajovec

(57) ABSTRACT

The bonding of components is facilitated by a conductive pattern which generates heat upon being irradiated with microwave or RF energy. The electrically conductive pattern is positioned on a first component surface and a curable resin having adhesive properties is applied thereto. A second component surface is placed in contacting relation with the resin and the conductive pattern is irradiated with microwave or RF energy to facilitate curing wherein the components are bonded together along the pattern. The conductive pattern can be utilized without adhesive resin wherein heat generated via the application of microwave or RF energy causes components to fuse together. The conductive pattern can be enveloped by polymeric material, wherein the polymeric material becomes the adhesive for bonding components when microwave or RF energy is applied.

12 Claims, 4 Drawing Sheets

U.S. PATENT DOCUMENTS

| | | | |
|---|---|---|---|
| 4,253,898 | 3/1981 | Rinker et al. | 156/272 |
| 4,565,728 * | 1/1986 | Gray et al. | 156/275.1 |
| 4,626,642 | 12/1986 | Wang et al. | 219/10.55 M |
| 4,707,402 | 11/1987 | Thorsrud | 428/328 |
| 4,777,336 | 10/1988 | Asmussen . | |
| 4,781,304 | 11/1988 | Lapeyre | 220/280 |
| 4,859,268 | 8/1989 | Joseph et al. | 156/275.5 |
| 4,869,767 | 9/1989 | Robinson et al. | 156/233 |
| 4,961,796 | 10/1990 | Perrin et al. | 156/69 |
| 4,969,968 | 11/1990 | Leatherman | 156/272.4 |
| 5,072,087 | 12/1991 | Apte et al. | 219/10.55 M |
| 5,120,176 | 6/1992 | Bhatia et al. | 412/8 |
| 5,182,134 | 1/1993 | Sato | 427/543 |
| 5,240,542 | 8/1993 | Miller et al. | 156/272.4 |
| 5,254,824 | 10/1993 | Chamberlain et al. | 219/10.57 |
| 5,321,222 | 6/1994 | Bible et al. . | |
| 5,328,539 | 7/1994 | Sato | 156/275.5 |
| 5,338,611 | 8/1994 | Lause et al. | 428/412 |
| 5,340,629 | 8/1994 | Roeker et al. | 428/344 |
| 5,400,460 | 3/1995 | Roeker et al. | 15/230.12 |
| 5,433,804 | 7/1995 | Nottingham et al. . | |
| 5,462,627 | 10/1995 | Oldham et al. . | |
| 5,603,795 * | 2/1997 | Paulauskas et al. | 156/275.1 |

* cited by examiner

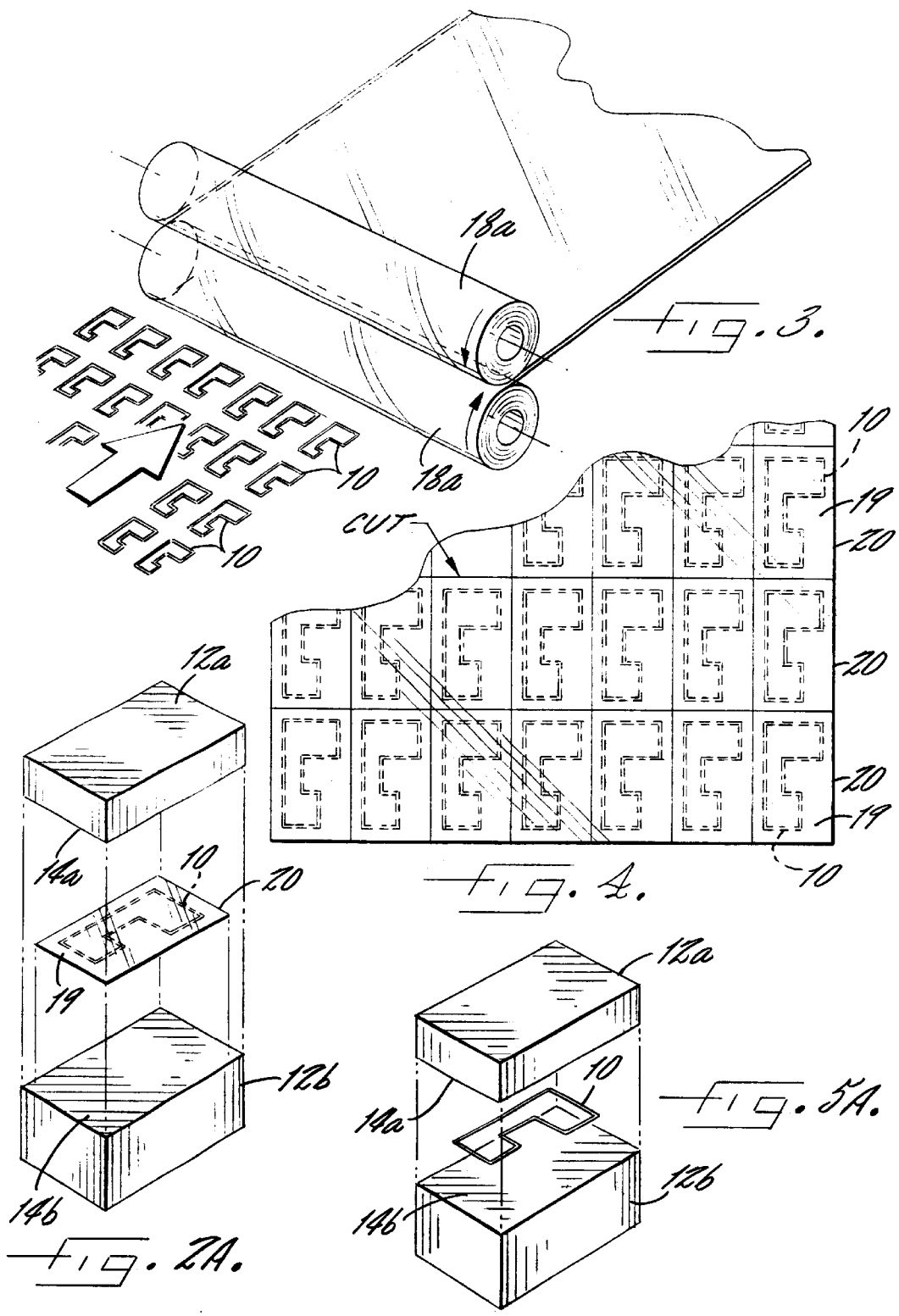

CONDUCTIVE INSERT FOR BONDING COMPONENTS WITH MICROWAVE ENERGY

FIELD OF THE INVENTION

The present invention relates generally to bonding components together, and more particularly to bonding components with microwave energy.

BACKGROUND OF THE INVENTION

There are many applications where it is necessary to bond various components together, but where conventional bonding techniques are not practical. For example, when assembling electronic devices, it is often necessary to bond components that are relatively thin and fragile, and thus not conducive to being secured with mechanical devices such as screws, rivets, and the like. Furthermore, many components comprise internal sub-components that are fragile and that can be easily damaged. As a result, adhesive resins have become a preferred means for securing many types of components together. Unfortunately, adhesive resins must be allowed to cure to properly bond two or more components together. Curing at or below room temperature is often a long process which decreases production throughput and increases production costs.

Techniques exist for curing adhesive resins with UV light at room temperature. However, the adhesive resin must be directly and completely exposed to the UV light to achieve efficient curing. Unfortunately, because of the various shapes and configurations of components, such as electrical components, shadow problems can prevent the UV light from reaching some portions of the adhesive resin, thereby increasing the time required to cure the resin.

Curing adhesives by adding heat can reduce, often dramatically, the time required to cure. Various methods of applying heat to adhesive resin to facilitate curing are known. For example, bonding techniques utilizing induction heating techniques wherein heat is produced via eddy currents generated by magnetically-induced currents, are described in U.S. Pat. No. 3,620,875 to Guglielmo, Sr. et al. Unfortunately, the addition of heat via these methods can damage the components being bonded together.

Heating techniques utilizing microwave energy are described in U.S. Pat. No. 4,626,642 to Wang et al., and U.S. Pat. No. 5,338,611 to Lause et al. Wang et al. describes blending electrically conductive fibers, such as steel, aluminum, and graphite, with a thermosetting adhesive resin to accelerate the rate of cure when subjected to microwave energy from a non-variable frequency microwave source, such as a domestic kitchen microwave oven. Lause et al. describes placing a heat generating strip at the interface of thermoplastic substrates to be joined together and applying microwave energy. The strip comprises a fiber-free thermoplastic carrier polymer that is miscible with the polymer of the substrates to be joined. The strip also contains submicron carbon black particles therein for absorbing microwave energy to produce heat. The strip is designed to vanish by being incorporated into substrates to be joined when exposed to microwave energy.

The prior art methods of component bonding with microwave energy do not, however, address the problem of arcing or local heating that often results when components, including any sub-components therewithin, are exposed to microwave energy. Furthermore, the use of metallic devices for generating heat upon being exposed to microwave energy has heretofore generally been avoided because of the uncontrollable nature of such material in a microwave field. Exposing adhesive resins to single frequency microwave energy can decrease the time required to cure as compared with conventional heating techniques. Unfortunately, the time required to cure most adhesives with microwave energy is longer than many components, especially electronics components, can withstand without incurring some damage from localized heating or arcing.

In some applications, the use of adhesive resins to bond components together is not practical. It may be necessary that the bonded components have no foreign substance at the interface between them for various reasons. A requirement for precise alignment and close tolerances may also dictate that other methods of bonding be used. One method often utilized in the electronics industry when bonding polymeric components together is ultrasonic welding, wherein no adhesives are used. Heat is generated via the vibrations of the molecules of the various component surfaces to be bonded, thereby causing the component surfaces to fuse together. Unfortunately, by its very nature, the application of ultrasonic waves often causes the components themselves to vibrate. As such, proper alignment is often difficult to achieve. Furthermore, because many such components have somewhat fragile internals, they are susceptible to damage from vibrations induced by the ultrasonic waves.

SUMMARY OF THE INVENTION

It is therefore an object of the present invention to decrease the time to cure adhesive resins utilized to bond components together.

It is another object of the present invention to utilize microwave energy to cure adhesive resin wherein components, including internal sub-components, bonded together by the resin are not damaged.

It is another object of the present invention to facilitate rapid bonding of components via microwave energy without adhesives and without damaging the components or internal sub-components.

These and other objects are accomplished, according to the present invention, by various techniques for bonding components together with microwave or radio frequency (RF) energy. According to one aspect of the present invention a method of bonding components with microwave energy comprises positioning an electrically conductive pattern on a first component surface and applying a curable resin having adhesive properties thereto. The adhesive resin is applied such that it contacts both the first component surface and the conductive pattern. A second component surface is positioned in contacting relation with the resin, and the resin and conductive pattern are irradiated with microwave energy to cure the resin, thereby bonding the first and second components together along the pattern. The conductive pattern typically comprises a closed loop. The curable resin may be a thermosetting resin, such as epoxy, or a thermoplastic resin. Irradiating the resin and conductive pattern comprises sweeping with variable frequency microwaves selected from at least one window of frequencies. Typically, at least one frequency that does not damage the first and second components is selected. Variable frequency microwaves can then be irradiated around this one frequency to achieve uniform heating of multiple components and batches of multiple components. Alternatively, the components may be irradiated with RF energy in lieu of microwave energy.

According to another aspect of the present invention, a method of bonding components with microwave energy comprises positioning a bonding insert at an interface between a first component surface and an abutting second component surface. The bonding insert comprises an electrically conductive pattern and a layer of polymeric material. The bonding insert is irradiated with microwave energy to adhesively bond the polymeric material to the first and second component surfaces along the pattern. The conductive pattern typically comprises a closed loop. The polymeric material may be a thermosetting resin, such as epoxy, or a thermoplastic resin. The bonding insert may also comprise an electrically conductive ink disposed on a layer, such as via screen printing on a polymeric sheet. The step of irradiating the bonding insert may comprise sweeping the bonding insert with variable frequency microwaves selected from at least one window of frequencies. The irradiating step typically comprises selecting at least one frequency that does not damage the first and second components. Alternatively, the bonding insert may be irradiated with RF energy in lieu of microwave energy.

According to another aspect of the present invention, a method of bonding components with microwave energy comprises positioning an electrically conductive pattern at an interface between a first fusible component surface and an abutting second fusible component surface. The pattern is irradiated with microwave energy to fuse the first and second component surfaces together along said pattern. The irradiating step typically comprises sweeping the conductive pattern with variable frequency microwaves selected from at least one window of frequencies. The irradiating step may comprise selecting at least one frequency that does not damage the first and second components. Alternatively, the conductive pattern may be irradiated with RF energy in lieu of microwave energy.

According to another aspect of the present invention, an article for facilitating the bonding of components with microwave or RF energy is provided. The article comprises an electrically conductive pattern enveloped by polymeric material compatible with the adhesion process (e.g., having free radicals that can form chemical and/or physical bonds with the components), and is configured to be inserted between components to be bonded. Typically, the conductive pattern comprises a closed loop. The polymeric material may be a thermosetting resin, such as epoxy, or a thermoplastic resin. The article may comprises an electrically conductive ink disposed on a polymeric substrate, wherein the substrate is formed from a thermosetting resin, such as epoxy, or a thermoplastic resin.

The present invention is advantageous over prior art methods of adhesively bonding components because selective bonding can be achieved and damage caused by localized heating and arcing can be eliminated. The present invention is especially advantageous when used in conjunction with the assembling of electronics components having complex shapes and configurations. The present invention is also advantageous when used in structural patching and crack healing applications, and when joining polymer matrix composite (PMC) materials with other materials, including, but not limited to, glass, metals, and ceramics. Other applications in which the present invention is advantageous include: bonding polymers for automotive parts; bonding dissimilar polymers, such as in the shoe industry; and in applications requiring gaskets, thread sealing, and the like.

The present invention is advantageous because component materials that do not suscept (absorb) microwave energy efficiently can be rendered more absorbing at higher temperatures because of the increase in the component material's dielectric loss as a function of temperature. A conductive pattern heats when microwave energy is applied thereby causing an increase in material temperature in its vicinity. This increase in material temperature leads to more microwave absorption by the material in the vicinity surrounding the conductive pattern. This facilitates focusing needed heat in the area of repair only.

BRIEF DESCRIPTION OF THE DRAWINGS

FIG. 2A illustrates using a bonding insert to bond two components together, according to one aspect of the present invention.

FIGS. 3 and 4 illustrate mass producing bonding inserts of the type depicted in FIG. 2A wherein conductive patterns are enveloped within polymeric material.

FIG. 5A illustrates using a conductive pattern to bond two components together, according to another aspect of the present invention.

DETAILED DESCRIPTION OF PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
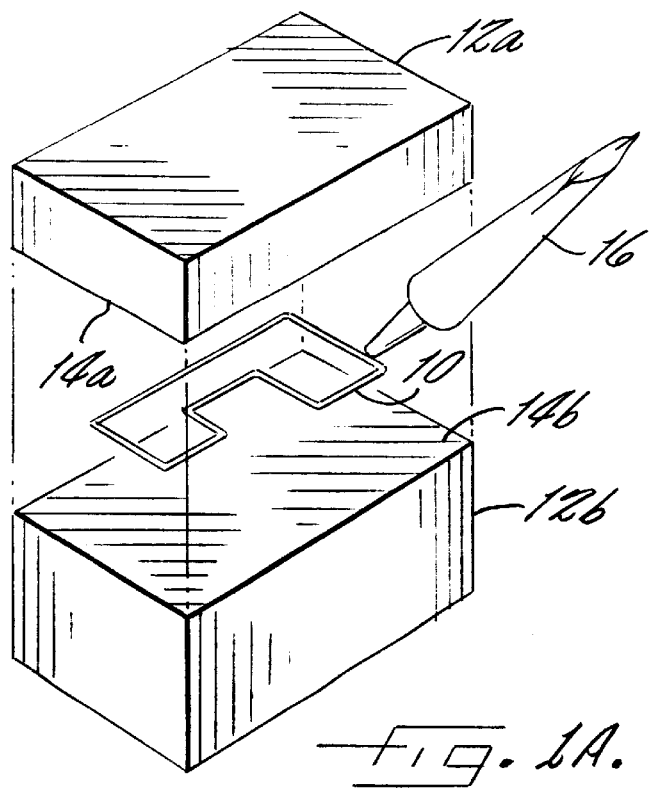
FIG. 1A illustrates the application of adhesive resin to a conductive pattern for the bonding of two components together, according to one aspect of the present invention.
Figure 1B:
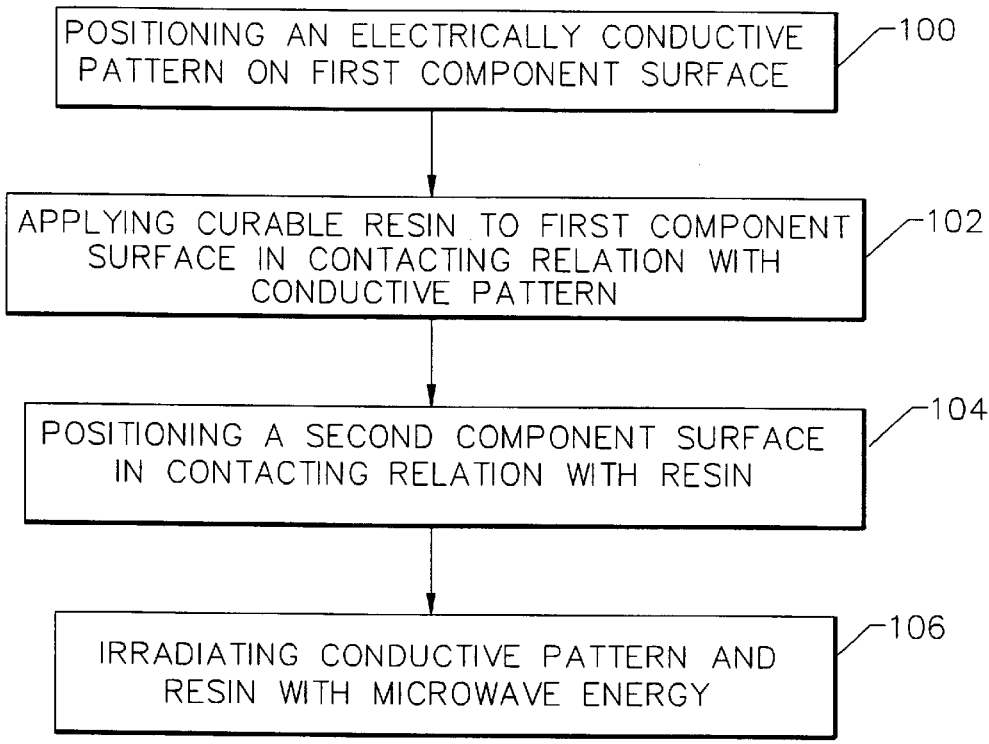
FIG. 1B is a flow chart illustrating operations for bonding components with the conductive pattern in FIG. 1A.

The present invention comprises techniques for bonding components wherein a thin conductive insert, such as metallic wire or ribbon, is irradiated with microwave energy, to facilitate rapid bonding of components, both with and without adhesive resin. Referring now to FIG. 1A, a conductive pattern 10 is utilized to bond first and second components 12a,12b together. Preferred operations for utilizing the conductive pattern 10 to join first and second components 12a,12b are illustrated in FIG. 1B. The electrically conductive pattern 10 is positioned on a first component surface 14b (Block 100). A curable resin (not shown) having adhesive properties is applied to the first component surface via applicator 16, so that the resin is also in contact with the conductive pattern (Block 102). A second component surface 14a is positioned in contact with the resin (Block 104). The conductive pattern 10 and resin are then irradiated with microwave energy (Block 106) to facilitate curing and selective bonding of the first and second components 12a, 12b along the conductive pattern. The frequency or frequencies are selected such that the components are not damaged, so that coupling efficiency is maximized, and so that the conductive pattern 10 does not arc.

Preferably, the adhesive resin is applied so that it touches both the conductive pattern 10 and the second component surface 14b. Because the conductive pattern 10 generates heat upon being irradiated with microwave energy, adhesive resin in contact therewith, or adjacent thereto, will be cured rapidly. Consequently, the amount of adhesive resin required to bond the first and second components 12a,12b together need only be applied along the conductive pattern 10.

Alternatively, adhesive resin can be applied to a component surface, and then the conductive pattern 10 placed therein. In yet another embodiment, the conductive pattern can be integrally connected with either or both first and second components 12a,12b, thereby requiring only the application of adhesive resin. In addition, a plurality of conductive patterns may be utilized at the same time to selectively bond components together.

The material of a conductive pattern couples with the applied microwave energy to create a flow of electrical current therethrough, which produces heat. The heat generated by the conductive pattern is a function of, among others, the conductive pattern material and configuration, and the degree of impermeability of the components to be joined to microwave energy. Consequently, the amount of heat necessary to cure an adhesive resin is controllable by the microwave energy applied inside the cavity hosting the components, the microwave power, and adjustment of the frequency or frequencies applied. The present invention is especially advantageous when used in conjunction with the assembling of electronics components wherein complex shapes and configurations of components are common.

A particularly suitable class of adhesive resins are thermosetting resins. By the term, "thermosetting", it is meant that the resin irreversibly solidifies or "sets" when completely cured by activating the curing agents, such as by heating using microwave irradiation. The present invention is also suitable for use with thermoplastic adhesive resins. Suitable resins include unsaturated polyesters, phenolics, acrylics, silicones, polyurethanes, polyamides and the like, and mixtures and blends thereof. Adhesive resins can include various additives commonly employed with thermosetting and thermoplastic resins such as fillers, curing agents, colorants, pigments, thickening agents, and the like.

Preferably, variable frequency microwave energy is applied to the conductive pattern. Variable frequency microwaves can rapidly and uniformly cure adhesive resin without adversely affecting the components being bonded together. However, single frequency microwave energy may be used in situations where component damage is not an issue. Additionally, the present invention can be adapted wherein RF energy is applied in lieu of microwave energy.

A particularly preferred variable frequency microwave furnace is described in U.S. Pat. No. 5,321,222, to Bible et al., the disclosure of which is incorporated herein by reference in its entirety. A variable frequency microwave furnace typically includes a microwave signal generator or microwave voltage-controlled oscillator for generating a low-power microwave signal for input to the microwave furnace. A first amplifier may be provided to amplify the magnitude of the signal output from the microwave signal generator or the microwave voltage-controlled oscillator. A second amplifier is provided for processing the signal output by the first amplifier. A power supply is provided for operation of the second amplifier. A directional coupler is provided for detecting the direction of a signal and further directing the signal depending on the detected direction. Preferably a high-power broadband amplifier, such as, but not limited to, a traveling wave tube (TWT), tunable magnetron, tunable klystron, tunable twystron, and a tunable gyrotron, is used to sweep a range of frequencies of up to an octave in bandwidth spanning the 300 MHz to 300 GHz frequency range.

Appropriate use of variable frequency processing, as disclosed herein, enhances uniform processing from one group of components to be bonded to the next because placement of the components within the microwave furnace is not critical. By contrast, with single frequency microwave processing, each group of components to be bonded must be oriented precisely the same way to achieve identical processing time and quality. Another advantage of using variable frequency microwave processing as disclosed herein is a reduction of the effects of thermal stresses. By selecting frequencies that cure a particular adhesive resin without causing excessive heating of the components, damage from thermal stresses may be avoided. Furthermore, because the present invention achieves shorter cure times than conventional curing methods, adjacent materials having different coefficients of thermal expansion, do not have enough time to expand or contract and, thereby, cause excessive thermal stresses at their interface.

The practical range of frequencies within the electromagnetic spectrum from which microwave frequencies may be chosen is about 0.90 GHz to 40 GHz. Every group of components irradiated with microwave energy typically has at least one bandwidth, or window of frequencies within this overall range that will cure the adhesive resin without causing damage to the components. The term "window", as used herein, refers to a range of microwave frequencies bounded on one end by a specific frequency and bounded on the opposite end by a different specific frequency. Above or below a particular window of damage-free frequencies, damage may occur to the components. A window may vary depending on the component configuration, geometry, and material composition. A window may also vary depending on the nature and configuration of sub-components within a component. Sub-components may have different windows of damage-free frequencies, as well. A component may have a sub-component therein requiring a narrow window of frequencies, and a sub-component therein requiring a wide window of frequencies. The selection of a damage-free window for a particular component or group of components is typically obtained either empirically through trial and error, or theoretically using power reflection curves and the like.

Within a window of damage-free frequencies for a particular group of components, it is generally desirable to select the frequencies that result in the shortest time to cure. Preferably, a component group is processed with a subset of frequencies from the upper end of each window. More modes can be excited with higher frequencies than with lower frequencies which means better uniformity in curing is typically achieved. Additionally, more microwave energy absorption and less microwave penetration depth, results in shorter cure times. However, any subset of frequencies within a window of damage-free frequencies may be used.

Many components that are irradiated with microwave energy have multiple windows of frequencies within which an adhesive resin will cure without causing damage. For example, a component may be irradiated with microwave energy without damage between 3.50 GHz and 6.0 GHz, and may also be irradiated without damage between 7.0 GHz and 10.0 GHz. The availability of additional windows provides additional flexibility for achieving rapid, yet damage-free curing. Often times complex geometrical configurations and material combinations are encountered which may actually shrink or close a particular window of frequencies available for processing. The availability of alternative windows permits a group of components to be bonded with microwave irradiation without having to resort to other curing methods.

Preferably, the step of curing is performed by "sweeping" the conductive pattern and resin with variable frequencies from within a particular window of damage-free frequencies. The term "sweeping", as used herein, refers to irradiating the adhesive resin and conductive pattern to many of the frequencies within a particular window. Frequency sweeping results in uniformity of heating because many more complementary cavity modes can be excited. Sweeping may be accomplished by launching the different frequencies within a window either simultaneously, or sequentially. For example, assume the window of damage-free frequencies for a particular group of components is 2.60 GHz to 7.0 GHz. Frequency sweeping would involve continuously and/or selectively launching frequencies within this range in any desirable increments, (e.g., sweeping between 2.6 and 3.3 GHz) such as 2.6001 GHz, 2.6002 GHz, 2.6003 GHz . . . 3.30 GHz, etc. Virtually any incremental launching pattern may be used.

The rate at which the different frequencies are launched is referred to as the sweeping rate. This rate may be any value, including, but not limited to, milliseconds, seconds, and minutes. Preferably, the sweep rate is as rapid as practical for the particular resin and workpiece being processed. The uniformity in processing afforded by frequency sweeping, provides flexibility in how groups of components to be bonded are oriented within the microwave furnace. Maintaining each group in precisely the same orientation is not required to achieve uniform processing.

Alternatively, the conductive pattern may be irradiated with RF energy in lieu of microwave energy. Any commercial or industrial generator capable of producing radio waves may be used to carry out the present invention. Generators may be added in parallel or in series to increase production or temperature. Generators may be harmonically suppressed or otherwise structured to meet standards for electromagnetic or radio frequency emissions. In a general embodiment, the components to be bonded are situated between two electrode plates which are charged alternately positive and negative. The plates are connected to the radio frequency generator.

It is preferable that the conductive pattern have a "closed-loop" configuration or a nearly closed-loop configuration in order to reduce the potential for arcing when the pattern is irradiated with microwave energy. Suitable conductive materials from which the pattern can be formed include, but are not limited to, metals, such as copper, aluminum, silver, and the like; conductive inks; and conductive non-metals, such as graphite, polymers, and the like. Semi-conductor materials can be used also. Preferably, the conductive insert has a pattern identical to the pattern of the desired bond between components. Especially preferred are conductive patterns formed of metallic wire, metallic tape, or conductive ink screen printed onto a polymeric flexible or rigid substrate.

Figure 2B:
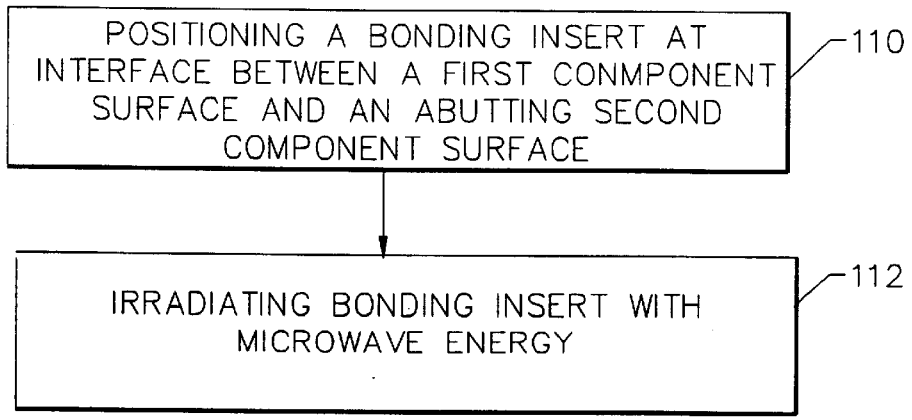
FIG. 2B is a flow chart illustrating operations for bonding components with the bonding insert in FIG. 2A.

According to another aspect of the present invention, illustrated in FIG. 2A, a bonding insert 20 comprising a conductive pattern 10 enveloped within polymeric material 19 is utilized to bond first and second components 12a,12b together. Referring to FIG. 2B, preferred operations for utilizing the bonding insert 20 to join first and second components 12a,12b, are illustrated. The bonding insert 20 is positioned at the interface of a first component surface 14b and an abutting second component surface 14a (Block 110). The bonding insert 20 is then irradiated with microwave energy (Block 112) to cause the conductive pattern 10 to generate heat and thereby cause the polymeric material 19 to bond the first and second components 12a,12b together. Preferably, the polymeric material 19 is selected so that when the conductive pattern 10 generates heat upon being irradiated with microwave energy, the material adhesively bonds with the material of the first and second components 12a,12b.

The bonding insert 20, according to this aspect of the present invention, is advantageous because the step of applying adhesive resin prior to the application of microwave energy is eliminated. Consequently, the time required to bond components is decreased thereby increasing production rates and lowering costs. Referring to FIGS. 3 and 4, fabrication of a bonding insert 20 according to the present invention, is preferably performed in a mass production operation wherein a plurality of conductive patterns 10 are enclosed between advancing sheets of polymeric material 18a,18b. Each bonding insert 20 may then be cut from the sheet, as shown in FIG. 4.

Figure 5B:
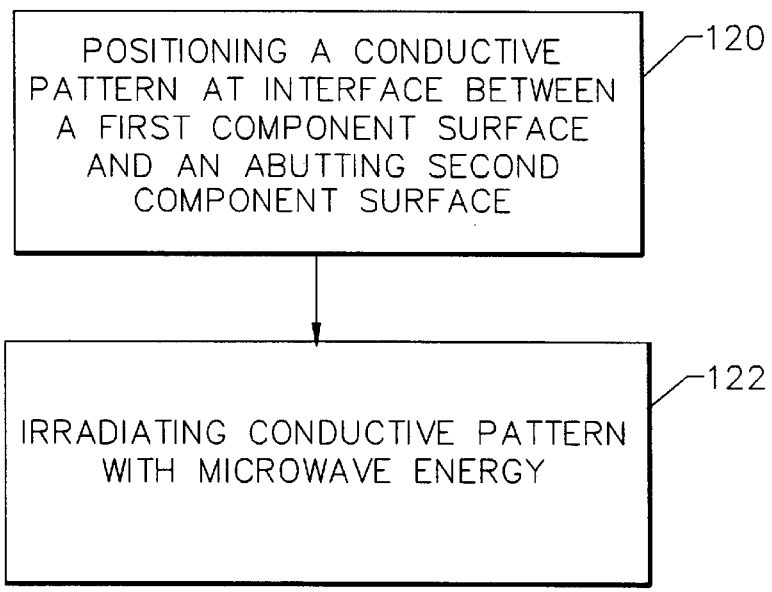
FIG. 5B is a flow chart illustrating operations for bonding components with the conductive pattern in FIG. 5A.

According to another aspect of the present invention, illustrated in FIG. 5A, first and second polymeric components 12a,12b can be bonded together with a conductive pattern 10 without utilizing adhesive resin. Referring to FIG. 5B, operations for utilizing the conductive pattern 10 to bond components are illustrated. A conductive pattern 10 is positioned at the interface of a first component surface 14a and an abutting second component surface 14b (Block 120). The conductive pattern 10 is then irradiated with microwave energy (Block 122) whereupon heat is generated causing the material of each polymeric component 12a, 12b to fuse together. The term "fuses" as used herein means that material of each component, upon the generation of heat, liquefies along the interface, mixes together, and solidifies to form a bond. As such, no adhesive is required to bond components together. The conductive pattern 10, according to this aspect of the present invention, is advantageous because the use of adhesives is eliminated altogether. Consequently, the time required to bond components is decreased thereby increasing production rates and lowering costs.

Figure 6A:
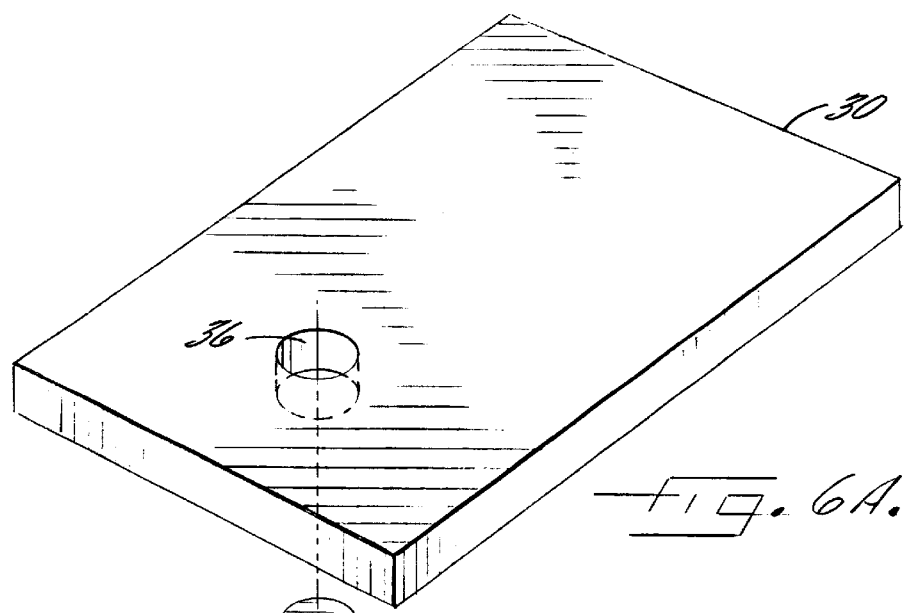
FIGS. 6A and 6B illustrate using a conductive pattern to bond two components together, according to another aspect of the present invention.
Figure 6B:
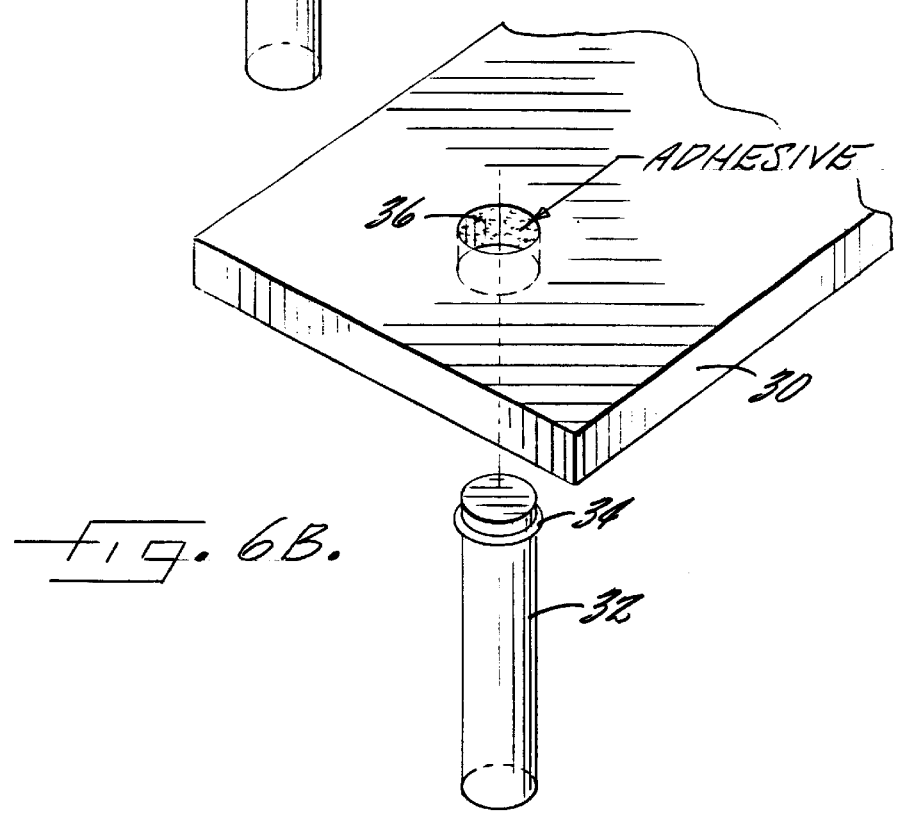

Referring to FIGS. 6A and 6B, another aspect of the present invention is illustrated. A first component 30, such as a substrate or circuit board, has a second component 32, such as a leg or rod, bonded thereto via a passageway 36, utilizing the present invention. The second component 32 is configured to be inserted within the passageway 36 in the first component 30. A conductive pattern is located around a portion of the second component 32 that will be located within the passageway and bonded to the first component. When microwave or RF energy is applied, the conductive pattern causes the first and second components to fuse together along the pattern as described above. Alternatively, an adhesive resin 38 can be utilized to bond the first and second components 30,32 together wherein the resin is cured via the conductive pattern when microwave or RF energy is applied as described above (FIG. 6B). In either configuration illustrated, the conductive pattern 34 can have a variety of shapes, sizes, and configurations. For example, the conductive pattern 34 may have a helical shape similar to that of a spring. The conductive pattern 34 may also have an ellipsoidal shape.

The present invention is advantageous in a variety of joining applications including the bonding of automotive parts, the bonding of dissimilar polymers in the shoe industry, and the joining and fusing of polymeric piping. Because conductive patterns can be configured to mimic the area to be bonded, the present invention is especially advantageous when used to join the polymeric packaging or outer casings of devices used in the electronics, imaging, and aerospace fields. In addition, the conductive pattern, according to the present invention, can be utilized in gasket materials, in thread sealing materials, in thread locking materials, and in porosity sealing materials.

The conductive pattern, according to the present invention, can be part of the dam used in liquid encapsulation techniques for electronics packaging. The conductive pattern can be made as part of the material to be bonded via insertion molding and other similar techniques. For example, a conductive wire loop can be included within a component such that bonding with another component requires only the addition of microwave or RF energy and adhesive resin, if necessary.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of bonding components comprising the steps of:
    positioning an electrically conductive pattern on a first component surface;
    applying a curable resin having adhesive properties to said first component surface, wherein said resin is in contacting relation with said conductive pattern;
    positioning a second component surface in contacting relation with said resin; and
    sweeping said resin and said conductive pattern with variable frequency microwaves selected from at least one window of microwave frequencies, said at least one window selected to avoid damage to said first and second components, said sweeping performed at a rate selected to uniformly heat said conductive pattern and cure said resin wherein said first and second components are bonded together along said pattern.

2. A method according to claim 1, wherein said curable resin is a thermosetting or thermoplastic resin.

3. A method according to claim 2, wherein said thermosetting resin is an epoxy.

4. A method according to claim 1, wherein said sweeping step comprises irradiating said resin and said conductive pattern with RF energy.

5. A method of bonding components comprising the steps of:
    positioning a bonding insert at an interface between a first component surface and an abutting second component surface, wherein said bonding insert comprises an electrically conductive pattern an electrically conductive pattern and a layer of polymeric material; and
    sweeping the bonding insert with variable frequency microwaves selected from at least one window of microwave frequencies, said at least one window selected to avoid damage to said first and second components, said sweeping performed at a rate selected to uniformly heat said bonding insert to cause said polymeric material to adhesively bond said first and second component surfaces together along said pattern.

6. A method according to claim 5, wherein said conductive pattern comprises a closed loop.

7. A method according to claim 5, wherein said polymeric material is a thermosetting or thermoplastic resin.

8. A method according to claim 7, wherein said thermosetting resin is an epoxy.

9. A method according to claim 5, wherein said bonding insert comprises an electrically conductive ink disposed on said layer.

10. A method according to claim 5, wherein said sweeping step comprises irradiating the bonding insert with RF energy.

11. A method of bonding components comprising the steps of:
    positioning an electrically conductive pattern at an interface between a first fusible component surface and an abutting second fusible component surface; and
    sweeping the pattern with variable frequency microwaves selected from at least one window of microwave frequencies, said at least one window selected to avoid damage to said first and second components, said sweeping performed at a rate selected to uniformly heat said bonding insert to fuse said first and second component surfaces together along said pattern.

12. A method according to claim 11, wherein said sweeping step comprises irradiating the pattern with RF energy.

* * * * *